United States Patent [19]
Choi et al.

[11] Patent Number: 5,687,810
[45] Date of Patent: Nov. 18, 1997

[54] POWER ASSISTANCE STEERING SYSTEM FOR USE IN A VEHICLE

[75] Inventors: Byoung-Yoon Choi, In-Cheon; Won-Taek Choi, Kangwon-Do; Je-Tae Yoo, Seoul, all of Rep. of Korea

[73] Assignee: Mando Machinery Corporation, Kyunggi-Do, Rep. of Korea

[21] Appl. No.: 548,817

[22] Filed: Oct. 26, 1995

[30] Foreign Application Priority Data

Dec. 12, 1994 [KR] Rep. of Korea ............... 94-33706

[51] Int. Cl.⁶ .......................................................... B62D 5/06
[52] U.S. Cl. ........................... 180/423; 180/441; 91/375 A
[58] Field of Search ............................... 180/417, 421, 180/422, 423, 426, 427, 428, 441; 91/374, 375 R, 375 A

[56] References Cited

U.S. PATENT DOCUMENTS

| | | | |
|---|---|---|---|
| 4,601,358 | 7/1986 | Kozuka et al. | 180/421 |
| 4,621,704 | 11/1986 | Kozuka | 91/375 A X |
| 4,790,401 | 12/1988 | Sonoda | 180/441 X |
| 4,793,433 | 12/1988 | Emori et al. | 91/375 A X |
| 4,796,715 | 1/1989 | Futaba et al. | 91/375 A X |
| 4,877,100 | 10/1989 | Emori et al. | 91/375 A X |
| 5,016,723 | 5/1991 | Sano | 91/375 A X |
| 5,189,941 | 3/1993 | Roethlisberger et al. | 91/375 A |
| 5,190,119 | 3/1993 | Nomura et al. | 91/375 A X |

Primary Examiner—Kevin Hurley
Attorney, Agent, or Firm—Anderson Kill & Olick, P.C.

[57] ABSTRACT

A power assistance steering system for use in a vehicle comprises a restricting mechanism including a cylindrical reaction piston having a reaction surface on which said reaction pressure is applied in order to cause said reaction piston to be biased downwardly, and at least one reversed V-shaped depression formed on a bottom skirt, the cylindrical reaction piston adapted to be held on the input shaft in such a way that said reaction piston can longitudinally and slidably reciprocate with respect to the input shaft, while circumferentially locked to the input shaft, and at least one semi-spherical protrusion formed on a middle end surface of said output shaft so as to be retained within the reversed V-shaped depression.

10 Claims, 6 Drawing Sheets

POWER ASSISTANCE STEERING SYSTEM FOR USE IN A VEHICLE

FIELD OF THE INVENTION

The present invention relates to a power assistance steering system for use in a vehicle; and, more particularly, to a power assistance steering system capable of adjusting the level of power assistance obtainable from a hydraulic actuator according to the vehicle speed.

DESCRIPTION OF THE PRIOR ART

One of the state-of-the-art power assistance steering systems of the type employing a hydraulic actuator as a power source thereof includes a rotary valve for defining a flow passage through which a working fluid from a hydraulic pump is supplied to the hydraulic actuator and controlling the flow rate of the working fluid into the hydraulic actuator. The rotary valve includes two parts: a rotor member formed on an input shaft and a sleeve secured to an output shaft of the power steering system. The input shaft is secured to a steering wheel; and the output shaft is connected to a pair of driving wheels through steering gears, linkages or the likes. Since the output shaft and the input shaft are connected through a resilient element, e.g., torsion bar, when a steering torque is exerted on the steering wheel, a relative angular displacement is created between the rotor member and the sleeve. The rotary valve determines the flow passage of the working fluid into the hydraulic actuator based on the direction of the relative angular displacement, i.e., a clockwise or counter clockwise rotation, and controls the flow rate into the hydraulic actuator according to the magnitude of the relative angular displacement, thereby providing a proper level of power assistance for steering.

As is well known, the magnitude of a force required for steering a vehicle is proportional to the magnitude of all opposing force exerted by the road surface to counter the vehicle weight; and the opposing force decreases as the vehicle speed increases. In other words, as the vehicle speed increases, the amount of force necessary to manipulate the steering wheel decreases. Thus, a large amount of power assistance by the hydraulic actuator is unnecessary when the vehicle is travelling at a high speed. Rather, an excess amount of power assistance may interfere with a safe steering of the vehicle.

Accordingly, various schemes have been proposed for varying the level of power assistance with the vehicle speed in the power assistance steering system. One of the schemes involves a restricting mechanism and a reaction pressure control valve, wherein the reaction pressure control valve is used for generating a reaction pressure proportional to the vehicle speed and the restricting mechanism is designed to reduce the magnitude of the relative angular displacement of the rotary valve which is created when an increased reaction pressure from the reaction pressure control valve is applied thereto, thereby adjusting the power assistance accordingly.

There is disclosed in Japanese Laid-Open Publication No. Sho 61-202976 a power assistance steering system involving the above described scheme. In this power assistance steering system, a housing, connected to an output shaft and provided with four passages, is furnished with a central input shaft. The four passages, arranged radially around an inner side of the housing, are each provided with a plunger that can slide inward and outward. In addition, each plunger is provided with a protruding semi-spherical portion on its upper surface, and the central input shaft is provided with four mating grooves for the semi-spherical protrusions.

In case of the power assistance steering system described above, however, there are various structural deficiencies which render it difficult to manufacture the multiplicity of sliding plungers and the passages equipped through the housing. For instance, since each of the plungers moves inward and outward in response to a pressure exerted by the working fluid contained in the passages, the clearance between each of the plungers and each of the passages has to be very small and provided with a high degree of precision in order to prevent the working fluid from leaking. The difficulty in manufacturing these plungers and passages to such a degree of exact standards tends to increase the overall manufacturing cost of the system.

SUMMARY OF THE INVENTION

It is, therefore, a primary object of the invention to provide a power assistance steering system capable of adjusting an optimal level of power assistance needed which can be manufactured at a reduced cost and time.

In accordance with one aspect of the present invention, there is provided a power assistance steering system for use in a vehicle, including an input shaft connected to a steering wheel, an output shaft connected to a pair of driving wheels, a rotary valve, a reaction pressure control valve for generating a proper reaction pressure proportional to the vehicle speed and a restricting mechanism for controlling a hydraulic power assistance according to the reaction pressure, wherein the restricting mechanism comprises: a cylindrical reaction piston having a reaction surface on which the reaction pressure is applied in order to cause the reaction piston to be biased downward, and at least one reversed V-shaped depression formed on a bottom skirt; means for supporting the reaction piston on the input shaft in such a way that the reaction piston is allowed to move vertically with respect to the input shaft, while circumferentially locked to the input shaft; and at least one semi-spherical protrusion formed on a middle end surface of the output shaft so as to be retained within the reversed V-shaped depression.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENT

Figure 1:
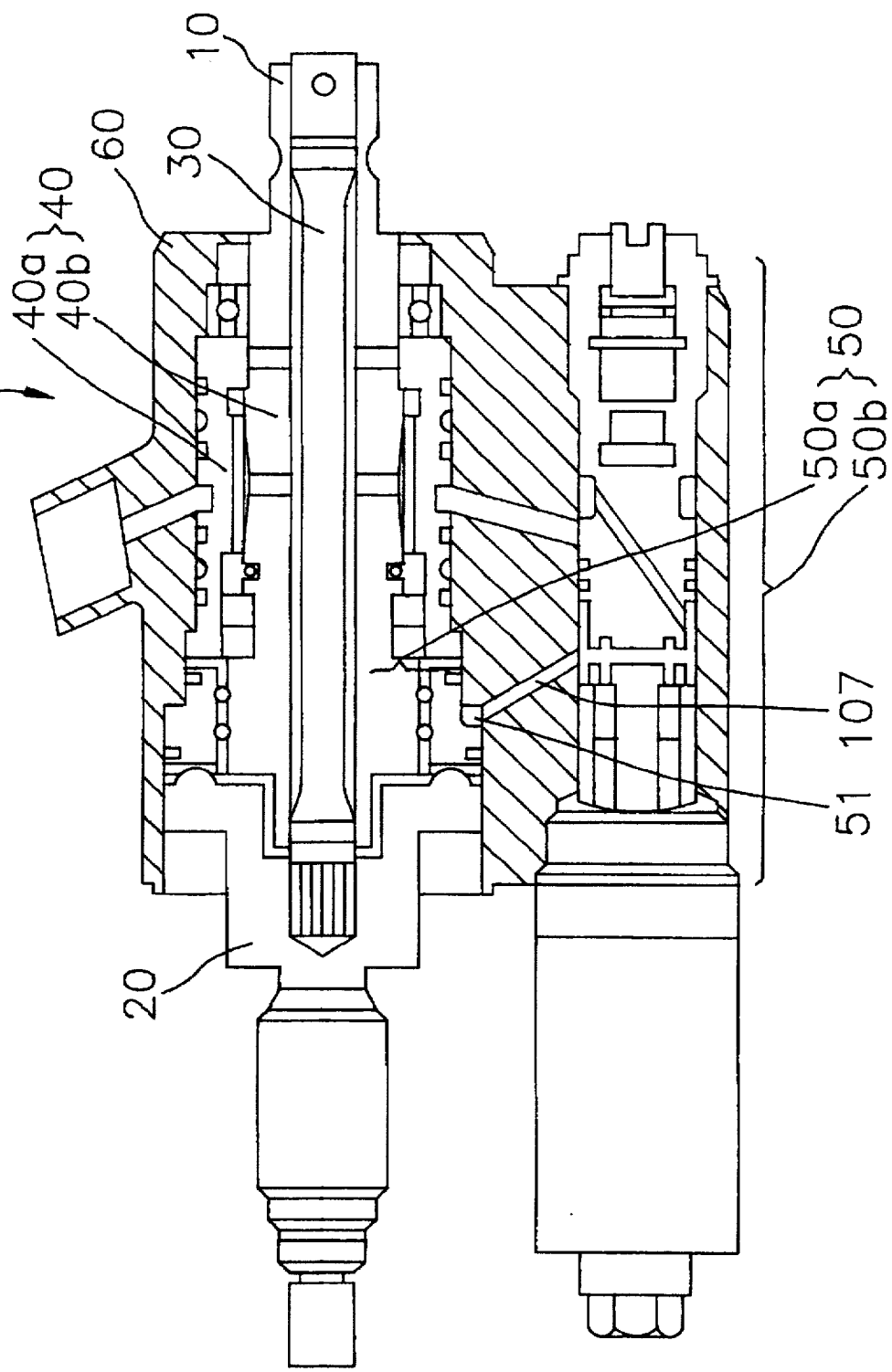
FIG. 1 offers a longitudinal cross-sectional view of a power assistance steering system in accordance with the present invention.

FIG. 1 illustrates a longitudinal cross-sectional view of a power assistance steering system 100 in accordance with the present invention. The inventive power assistance steering system 100 is divided into an input shaft 10, an output shaft 20, a torsion bar 30, a rotary valve 40, a reaction device 50 and a shaft housing 60. The input shaft 10 is adapted to rotate with a steering wheel. The output shaft 20 is connected to a pair of driving wheels via a steering linkage, a steering gear or the likes. The torsion bar 30 is pinned to the input and the output shafts 10, 20 at its both ends, and is subjected to a twist when a steering torque is applied to the steering wheel.

The rotary valve 40 comprises a valve rotor 40b and a sleeve 40a, and serves to determine the direction and magnitude of a power assistance. When a steering torque is transmitted to the input shaft 10, a relative angular displacement occurs between the valve rotor 40b formed on the input shaft 10 and the sleeve 40a secured to the output shaft 20. Depending on the direction and magnitude of the relative angular displacement, a corresponding oil passage from a hydraulic pump(not shown) into a hydraulic actuator is selected and a corresponding flow rate of oil from the hydraulic pump into the hydraulic actuator is determined, thereby generating a corresponding power assistance.

The reaction device 50 is divided into a restricting mechanism 50a and a reaction pressure control valve 50b. The latter 50b creates a reaction pressure proportional to the vehicle speed, the reaction pressure being applied to a reaction chamber 51. The restricting mechanism 50a serves to hinder a relative rotation of the input shaft 10 with respect to the output shaft 20, generating the relative angular displacement between the valve rotor 40b and the sleeve 40a when the reaction pressure from the reaction pressure control valve 50b is applied to the reaction chamber 51. Consequently, the power assistance from the hydraulic actuator is reduced, when the vehicle travels at a high speed.

The shaft housing 60 provides the input shaft 10, the output shaft 20, the torsion bar 30, the rotary valve 40 and the restricting mechanism 50a with their respective mounting places.

Figure 2A:
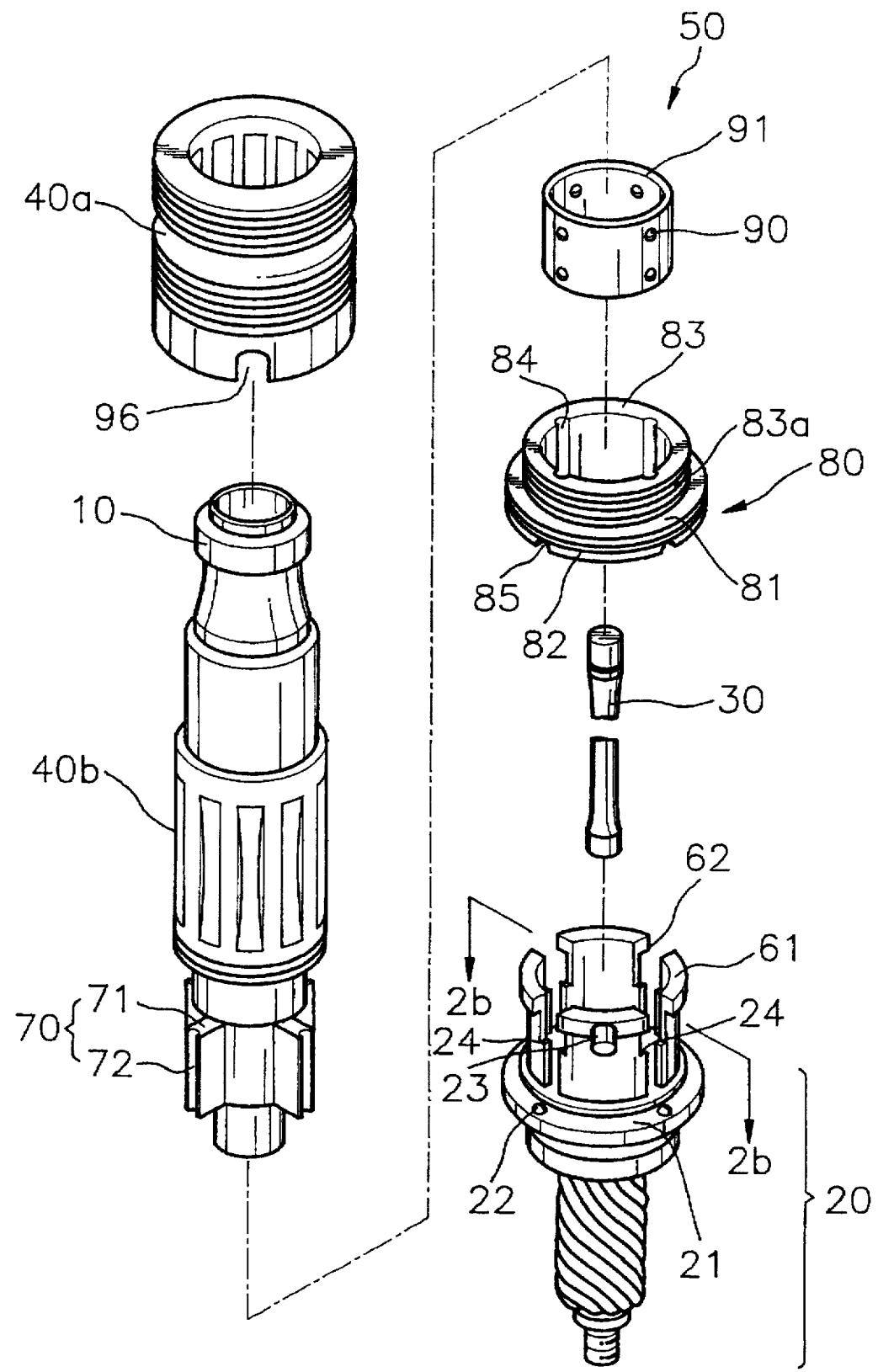
FIG. 2A represents an exploded perspective view of an input shaft, an output shaft and a restricting mechanism employed in the inventive power assistance steering system.

The input and output shafts 10, 20 and the restricting mechanism 50a will now be described in detail with reference to FIGS. 2A and 2B. FIG. 2A represents an exploded perspective view of the input shaft 10, the output shaft 20 and the restricting mechanism 50a employed in the inventive power assistance steering system 100.

The input shaft 10 is pinned to an upper portion of the torsion bar 30, and formed with the valve rotor 40b at its middle portion and a cross-shaped portion 70 at a lower end thereof. The cross-shaped portion 70 is provided with four protruding portions 71, each of the protruding portions 71 including a longitudinal groove 72 at its top portion having a semi-circled cross section.

The output shaft 20 is pinned to a bottom portion of the torsion bar 30. The output shaft 20 comprises four stoppers 61 extending from an upper end surface 21 thereof. A pair of lugs 23 is radially formed on two of the stoppers 61 facing each other, respectively. Shaped between the adjacent stoppers 61 are four slots 62. Each of the slots 62 serves to receive each of the protruding portions 71, respectively, and is provided with a pair of step-shaped lateral flanks 24 in order to facilitate the insertion of the input shaft 10 into the output shaft 20. Furthermore, a plurality of semi-spherical protrusions 22 is formed on the upper end surface 21 thereof.

A cylindrical reaction piston 80 is adaptively located around an external surface of the stoppers 61 between the upper end surface 21 and the lugs 23. The reaction piston 80 has a middle end surface 81 on which the reaction pressure from the reaction pressure control valve 50b is applied. The reaction piston 80 also has a large diameter skirt 82 extending downward from the middle end surface 81 and a small diameter skirt 83 extending upward from same 81. The reaction pressure from the reaction pressure control valve 50b is also applied on a lateral external surface 83a of the small diameter skirt 83. A like number of reversed V-shaped depressions 85 as the number of semi-spherical protrusions 22 is provided on a lower end of the large diameter skirt 82. Furthermore, the reaction piston 80 includes four inner longitudinal grooves 84. Each of the inner longitudinal grooves 84 having a semi-circled cross section is arranged on an inner surface of the reaction piston 80 so that each can face toward the grooves 72 on the input shaft 10, respectively, after the input shaft 10 and the reaction piston 80 are assembled together.

Figure 2B:
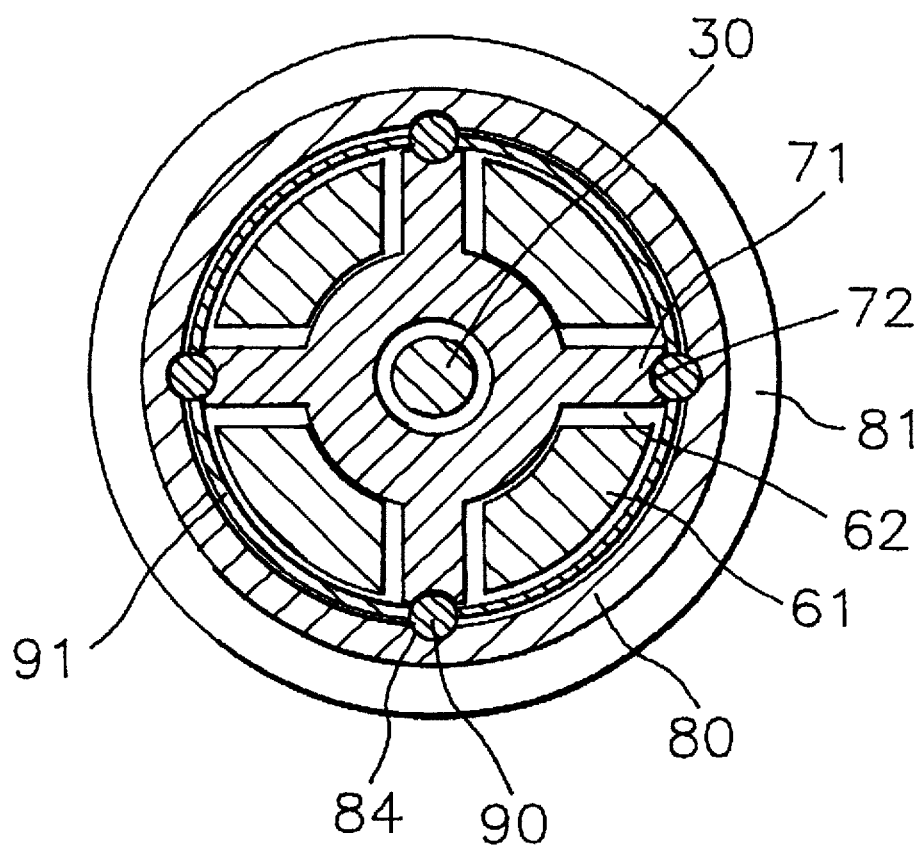
FIG. 2B provides a schematic horizontal sectional view taken along line 2b—2b of FIG. 2A, showing an assembled restricting mechanism.

FIG. 2B illustrates a horizontal sectional view of the input and the output shafts 10, 20 and the reaction piston 80 in their assembled condition. There is shown a plurality of balls 90 positioned in a space between the longitudinal grooves 72 of the cross-shaped protruding portions 70 on the input shaft 10 and the grooves 84 formed on the reaction piston 80. Owing to the presence of the plurality of balls 90, the reaction piston 80 is supported on the input shaft 10 so that it can vertically move up and down with respect to the input shaft 10 and also rotate with the input shaft 10. Also positioned between the protruding portions 71 and the reaction piston 80 is a ball retainer 91 for causing the plurality of balls 90 to be spaced from one another. The ball retainer 91 has a plurality of rows of through-holes for gripping the balls 90 (see FIG. 2A). It is preferable that the ball retainer 91 employed in the inventive power assistance steering system 100 be made of a heat-resisting plastic.

Returning to FIG. 2A, the sleeve 40a is an element which constitutes the rotary valve 40 together with the valve rotor 40b. The sleeve 40a has a pair of recesses 96 for receiving the lugs 23 of the output shaft 20, and is rotatably mounted within the shaft housing 60.

More detailed description of the reaction pressure control valve 50b employed in the inventive power assistance steering system 100 will now be made using FIGS. 3 and 4.

Figure 3:
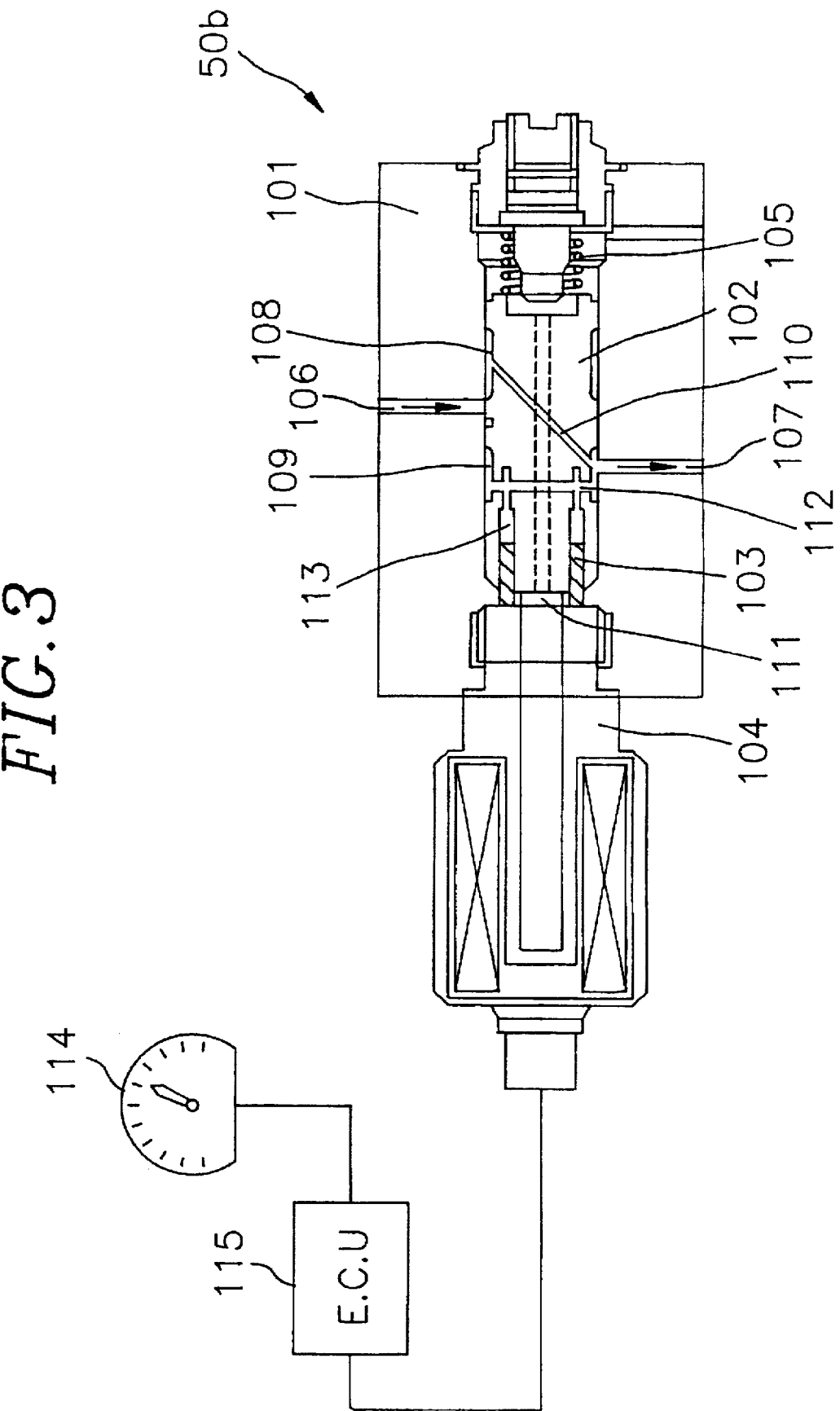
FIG. 3 depicts a schematic sectional view of a reaction pressure control valve employed in the inventive power assistance steering system.

As shown in FIG. 3, the reaction pressure control valve 50b, in accordance with the present invention, is largely divided into a valve housing 101, a valve spool 102, a plurality of pins 103, a solenoid valve 104 and a spring 105. The valve housing 101 has an inlet port 106 through which a working fluid under pressure is supplied and a reaction passage 107 extending into the reaction surfaces 81 and 83a of the reaction piston 80 defining the reaction chamber 51 (see FIGS. 1 and 2A).

The valve spool 102 is slidably mounted within the value housing 101, and has a first orifice portion 108 and a second orifice portion 109. The first and the second orifice portions 108 and 109 are separately formed on an external surface of the valve spool 102, and communicate with each other via a first passage 110. The second orifice portion 109 is so sized and arranged that it can communicate with the reaction passage 107 through the entire range of a displacement of the valve spool 102. While allowing the second orifice portion 109 to communicate with the reaction passage 107, the valve spool 102 slides back and forth within the valve housing 101 from a first position in which the first orifice 108 fully communicates with the inlet port 106 to a second position in which the first orifice 108 and the inlet port 106 are completely misaligned with each other. FIG. 3 illustrates a situation in which the valve spool 102 is in the second position.

On the other hand, the second orifice portion 109 also communicates with a second passage 112 formed through the valve spool 102. The second passage 112 is adapted to communicate with a plurality of pin holes 113 formed within the valve spool 102, parallel to the direction of the valve spool movement. Each of the pin holes 113 is inserted with a pin 103, one end of each of the pins 103 being connected to the solenoid valve 104.

The pins 103 are used to move the valve spool 102 toward the second position when the reaction pressure within the passages 107, 110, 112 exceeds a maximum reaction pressure that is permitted within the passages of the valve spool 102. Referring to FIG. 4, it can be seen that a force Fp applied by the reaction pressure on the pin 103 causes the valve spool 102 to be biased toward the second position.

Turning back to FIG. 3, the spring 105 serves to depress the valve spool 102 toward the first position thereof. The solenoid valve 104 has a rod 111 for urging the valve spool 102 toward the second position thereof against the spring 105. The rod 111 is adapted to protrude out of the solenoid valve 104 or to be retracted into the solenoid valve 104. The protruding length of the rod 111 is proportional to the magnitude of an electric current provided from an electronic control unit(ECU) 115. The ECU 115 connected to a vehicle speed sensor 114 applies an electric current to the solenoid valve 104, the electric current applied being inversely proportional to the vehicle speed.

The operation of the reaction pressure control valve 50b will now be described hereinbelow.

Figure 4:
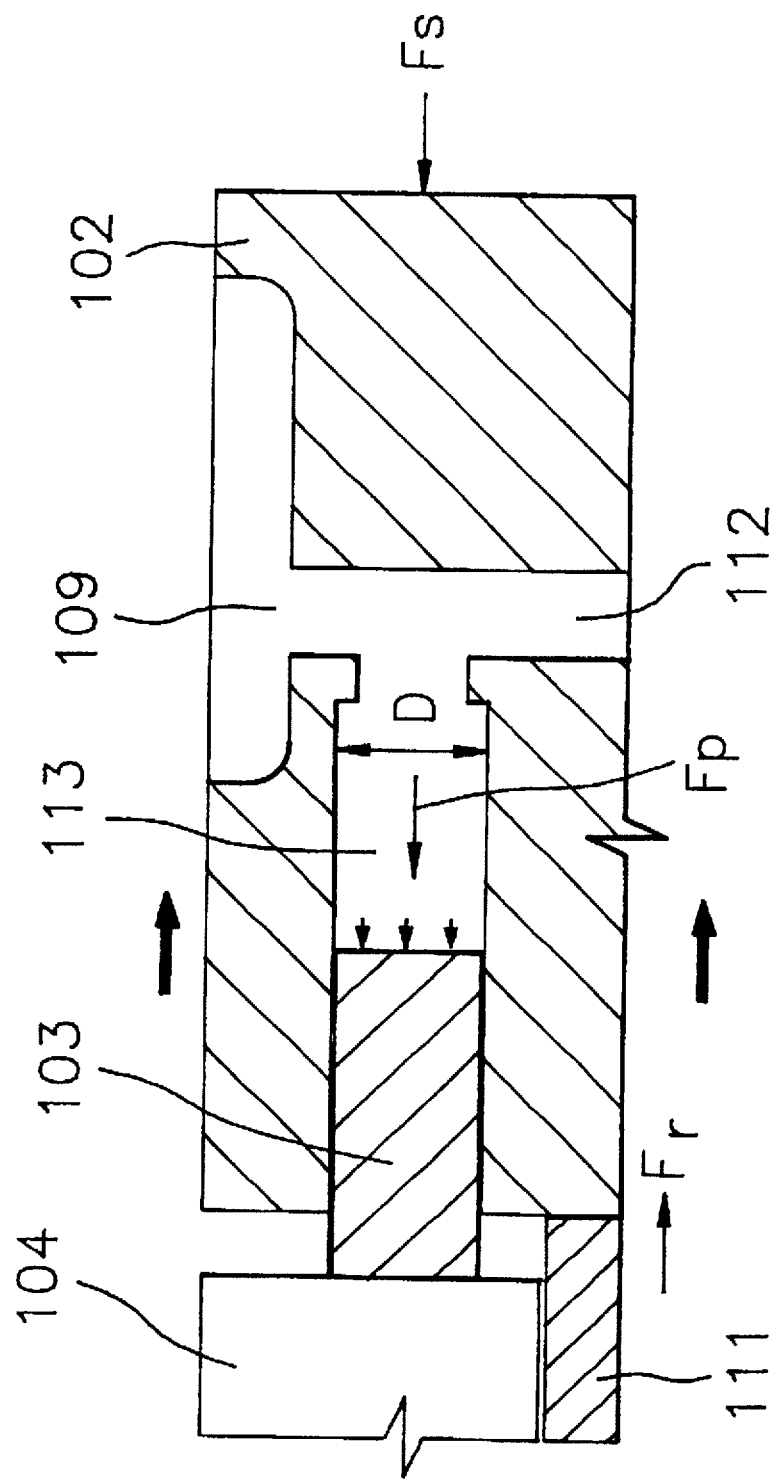
FIG. 4 presents a schematic view showing the relationship between a plurality of pins and a valve spool in the reaction pressure control valve of the inventive power assistance steering system.

As shown in FIG. 4, the valve spool 102 is subjected to the force Fp exerted by the reaction pressure and a force Fr exerted by the solenoid valve 104, which push the valve spool 102 towards the second position, and the resilient force Fs exerted by the spring 105 which pushes the valve spool 102 toward the first position. Accordingly, the valve spool 102 moves backwards or forwards depending on the magnitude of Fp+Fr or the magnitude of Fs. If the magnitude of Fp+Fr is larger than that of Fs, it moves backwards, and vice versa.

First, when the vehicle travels at a high speed, a low level of electric current is provided to the solenoid value 104 from the ECU 115, which, in turn, forces the solenoid valve 104 to exert a low level of the force Fr on the value spool 102. Accordingly, the valve spool stays at the first position where the first orifice portion 108 and the inlet port 106 fully communicate with each other. Therefore, a high degree of reaction pressure is established within the reaction passage 107 and the reaction chamber 51.

On the other hand, in order to prevent the reaction pressure within the passages 107, 110, 112 from exceeding the permitted maximum reaction pressure, when the reaction pressure reaches the permitted maximum reaction pressure, the valve spool 102 is designed to move toward the second position due to the increase in the force Fp. Accordingly, the plurality of pins 103 is constructed in such a way that the combined cross-sectional areas thereof can make the force Fr+Fp larger than the force Fs, when the pressure within the passages 107, 110, 112 reaches the permitted maximum reaction pressure.

When the vehicle speed decreases, the electric current applied to the solenoid valve 104 from the ECU 115 increases, causing the force Fr exerted by the solenoid valve 104 to increase. When the force Fr+Fp becomes larger than the force Fs, the valve spool 102 begins to move toward the second position, causing the misalignment between the first orifice portion 108 and the inlet port 106 to increase. As a result, the reaction pressure established within the passages 107, 110, 112 is lowered.

Finally, during a parking maneuver or when the vehicle travels at low speeds, the valve spool 102 stays near the second position due to the substantially maximum force Fr exerted by the solenoid valve 104. In such a situation, the misalignment between the first orifice portion 108 and the inlet port 106 becomes almost complete, resulting in a substantially zero reaction pressure within the passages 107, 110, 112.

Figure 5:
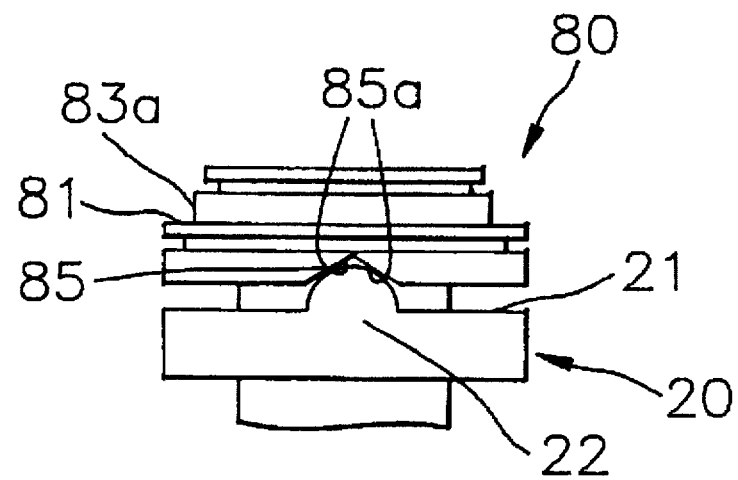
FIG. 5 sets forth a schematic view of a reaction piston employed in the restricting mechanism of the inventive power assistance steering system.
Figure 6:
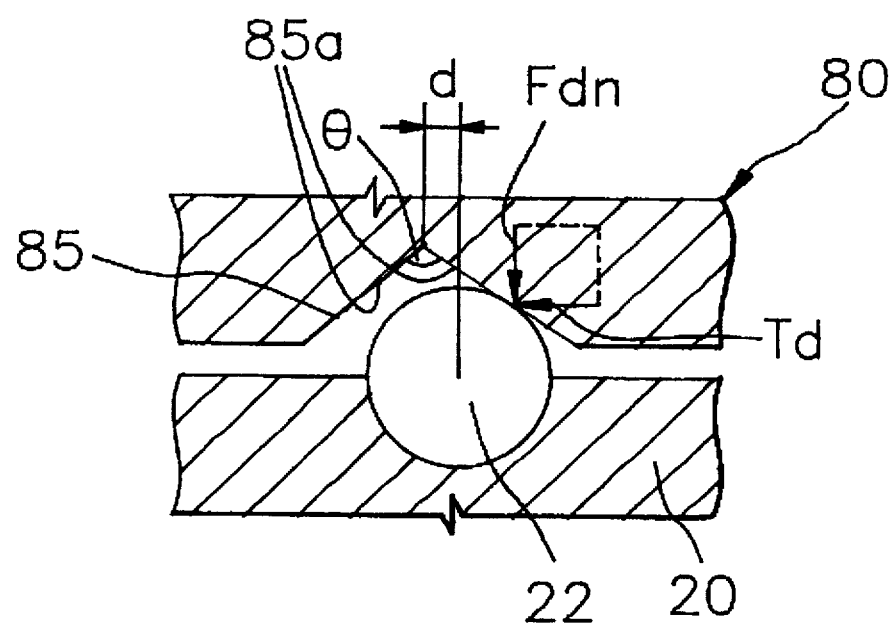
FIG. 6 shows the reaction piston and a semi-spherical protrusion of the restricting mechanism of the inventive power assistance steering system.

More detailed description of the operation of the reaction piston 80 employed in the inventive power assistance steering system 100 is now made with reference to FIGS. 5 and 6.

Each of the reversed V-shaped depressions 85 of the inventive reaction piston 80 has two straight lines 85a. It is preferable that the angle between the straight lines 85a of each depression 85 ranges from 100° to 140° in accordance with the present invention.

As shown in FIG. 5, when no steering torque is exerted, each of the reversed V-shaped depressions 85 is always centered to the center of each of the semi-spherical protrusions 22, regardless of the vehicle speed. Under this condition, since the relative angular displacement between the valve rotor 40b and the sleeve 40a of the rotary valve 40 is essentially zero, no power assistance is generated.

During a high speed driving mode, the output shaft 20 rotates together with the reaction piston 80 circumferentially locked to the input shaft 10, maintaining the centered condition between the reversed V-shaped depressions 85 and the semi-spherical protrusions 22. This occurs when a high reaction pressure from the reaction pressure control valve 50b is applied on the surfaces 81 and 83a of the reaction piston 80, restricting an upward movement of the reaction piston 80.

Referring to FIG. 6, it can be seen that the reaction piston 80 cannot be rotated with respect to the output shaft 20 without its upward translation. The power assistance level control of the inventive power assistance steering system is obtained by properly limiting such upward movement of the reaction piston 80. And the proper limiting action is achieved by the reaction pressure proportional to the vehicle speed.

Furthermore, since the reaction piston 80 becomes rotatable with respect to the protrusion 22, when the urging force Fdn exerted by the reaction pressure is smaller than the steering torque Td of the driver, the larger the force Fdn is, the smaller a possible relative angular displacement d between the reaction piston 80 and the protrusion 22 is. If an extremely large force Fdn is applied on the reaction piston 80, in the course of a driver's increasing the steering effort, the tire turning may be made only by the driver's steering torque Td.

Therefore, when the vehicle travels at a low to medium speed, the angular displacement d between the two members 20, 80 is permitted depending upon the magnitude of the reaction pressure; and a corresponding power assistance to the angular displacement d is generated.

Although the invention has been shown and described with respect to the preferred embodiments, it will be understood by those skilled in the art that various changes and modifications may be made without departing from the spirit and scope of the invention as defined in the following claims.

What is claimed is:

1. A power assistance steering system for use in a vehicle, including an input shaft connected to a steering wheel, an output shaft connected to a pair of driving wheels, a rotary valve, a reaction pressure control valve for generating a reaction pressure proportional to a vehicle speed and a restricting mechanism for controlling a hydraulic power assistance according to the reaction pressure, characterized in that the restricting mechanism comprises:

a cylindrical reaction piston having a reaction surface on which the reaction pressure is applied in order to cause the reaction piston to be biased downward, and at least one reversed V-shaped depression formed on a bottom skirt;

means for supporting the reaction piston on the input shaft in such a way that the reaction piston is allowed to move vertically with respect to the input shaft, while circumferentially locked to the input shaft; and at least one semi-spherical protrusion formed on a middle end surface of the output shaft so as to be retained within the reversed V-shaped depression.

2. The power assistance steering system as recited in claim 1, further characterized in that the reaction pressure control valve position:

a valve housing having an inlet port through which a working fluid under pressure is supplied, and a reaction passage extending into the reaction surface on the reaction piston;

a valve spool provided with an external surface and having a first orifice portion and a second orifice portion separately formed on the external surfaces thereof, the second orifice portion communicating with the first orifice portion through the reaction passage, the valve spool mounted within the valve housing in such a manner that the valve spool slidably reciprocates from a first position in which the first portion orifice portion fully communicates with the inlet port to a second position in which the first orifice portion and the inlet port are misaligned with each other;

a solenoid valve adapted to push the valve spool toward the second position in response to a decrease in the vehicle speed; and a spring adapted to depress the valve spool toward the first position.

3. The power assistance steering system as recited in claim 1, wherein the reaction surface of the reaction piston is defined with a middle end surface from which the bottom skirt extends downwardly and an external surface of a smaller skirt extending from the middle end surface upwardly.

4. The power assistance steering system as recited in claim 1, wherein the straight line portions of the reaction piston have an angle therebetween ranging from 100° to 140°.

5. The power assistance steering system as recited in claim 1, wherein the reaction piston supporting means includes:

a quartet of external longitudinal grooves, each of the grooves having a semi-circled cross section and formed on four protrusions, respectively, of a cross-shaped portion positioned on a lower end of the input shaft;

a quartet of inner longitudinal grooves, each of the inner longitudinal grooves being arranged to face toward one of the external longitudinal grooves, respectively, and having a semi-circled cross section;

a plurality of balls retained between the protrusions of the cross-shaped portion and the reaction piston; and a ball retainer for causing the balls to be spaced from one another, positioned between the protrusions of the cross-shaped portion and the reaction piston.

6. The power assistance steering system as recited in claim 2, wherein the reaction pressure control valve further comprises:

a plurality of pin holes formed within the valve spool, with a parallel relationship to the direction of the valve spool movement; and a corresponding number of pins to the pin holes, each of the pins inserted within its corresponding pin hole and secured to the solenoid valve at one of its ends.

7. The power assistance steering system as recited in claim 5, wherein the ball retainer is made of a heat-resisting plastic.

8. The power assistance steering system as recited in claim 5, wherein the reaction piston supporting means further comprises a quartet of stoppers extending from the middle end surface of the output shaft so as to provide four slots, each of the slots for receiving one of the four protrusions.

9. The power assistance steering system as recited in claim 6, wherein the plurality of pins has a combined cross-sectional area of at least (Fs–Fp)/ P', wherein Fs is a resilient force of the spring, Fp is a pushing force exerted by the solenoid valve against the valve spool, and P' is a maximum reaction pressure permitted within the passages of the valve spool.

10. The power assistance steering system as recited in claim 8, wherein each of the stoppers has a pair of step-shaped lateral flanks for facilitating an assembling process of the input shaft into the output shaft.

* * * * *